J. S. SMART.
COLLAPSIBLE BENCH LEG.
APPLICATION FILED SEPT. 22, 1920.
1,398,471. Patented Nov. 29, 1921.
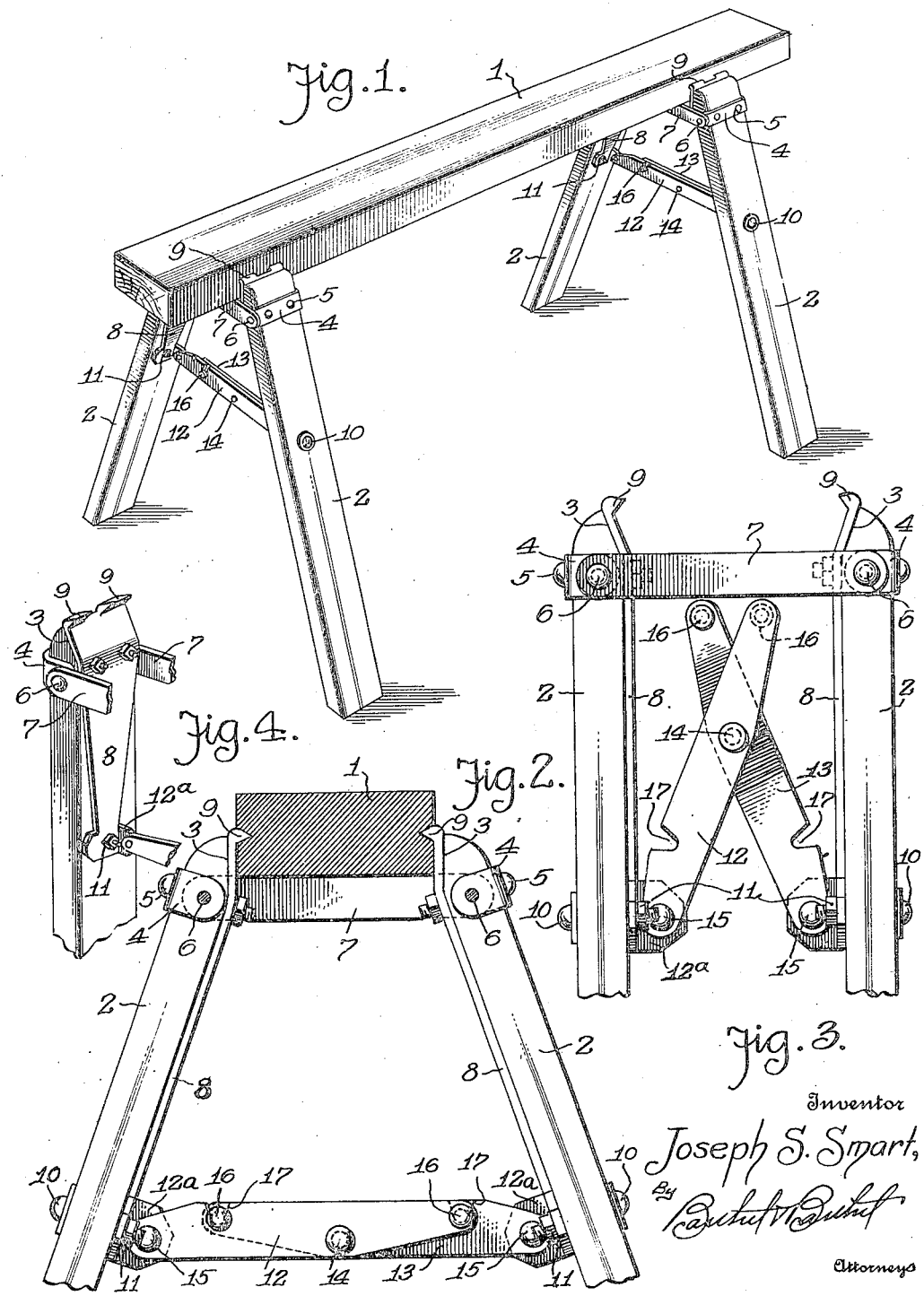
Inventor
Joseph S. Smart,
Attorneys

UNITED STATES PATENT OFFICE.

JOSEPH S. SMART, OF DETROIT, MICHIGAN.

COLLAPSIBLE BENCH-LEG.

1,398,471. Specification of Letters Patent. Patented Nov. 29, 1921.

Application filed September 22, 1920. Serial No. 412,092.

*To all whom it may concern:*

Be it known that I, JOSEPH S. SMART, a citizen of the United States of America, residing at Detroit, in the county of Wayne and State of Michigan, have invented certain new and useful Improvements in Collapsible Bench-Legs, of which the following is a specification, reference being had therein to the accompanying drawings.

This invention relates to collapsible bench legs, and has special reference to legs or supports that may form part of a saw horse, trestle, bench, table or the like, so that the structure may be collapsed for the convenience of compactness in carrying or storing.

My invention aims to furnish legs or similar supporting members with novel gripping members by which a plank, rail, board or other structure may be gripped and safely supported, the gripping members being of such shape as to reinforce walls of the legs or supports and afford substantial connections for toggle braces connecting the legs or supports and adapted to maintain the same distended with the gripping members firmly engaging a plank or the like.

My invention further aims to provide pieces of hardware for connecting the legs or supports so that the pieces of hardware will coöperate with the gripping members of the legs or supports in preventing clamped ends of the legs or supports from splitting, breaking or becoming otherwise injured during the operation of clamping the legs or supports in engagement with the plank or the like.

My invention further aims to accomplish the above result by a simple, durable and inexpensive construction that will be hereinafter specifically described and then claimed, and reference will now be had to the drawing, wherein—

Figure 1 is a perspective view of a plank provided with collapsible legs in accordance with my invention;

Fig. 2 is an enlarged cross sectional view of a portion of the same;

Fig. 3 is an end view of a portion of the legs showing the same collapsed, and

Fig. 4 is a perspective view of the upper end of one of the legs.

Collapsible legs when in use, provide A frames at the ends of a plank 1 and since the A frames are identical in construction, it is only necessary to describe in detail one of the A frames.

Each A frame comprises legs 2 which may be placed in parallel relation, when collapsed, or diverging relation, when in use. The upper ends of the legs have the inner and outer walls thereof beveled or inclined, as at 3, and the outer and side walls of said legs are bound by U shaped straps 4 suitably connected to the outer walls of the legs 2, as at 5. Pivotally connected to the ends of the straps 4, by pivot pins or rivets 6, are the apertured ends of transverse connecting members 7, said members being disposed in parallelism and coöperating with the straps 4 in bracing the outer and side walls of the legs 2, at the upper ends thereof. The connecting members 7 pivotally support the upper ends of the legs 2 whereby said legs may be swung into parallelism, as shown in Fig. 3, or may be distended and placed in diverging relation, as shown in Fig. 2.

On the inner walls of the legs 2 are gripping and reinforcing members 8, said members being disposed longitudinally of the inner walls of the legs 2 so that both ends of each member may be utilized for a purpose.

The upper ends of the gripping members 8 are bent to conform to the upper inner walls of the legs 2, and said gripping members are held in place by the same fastening means as the straps 4, said fastening means having been indicated at 5, and bolts and nuts may be conveniently used for such purposes. The upper ends of the gripping members 8 are also shaped to provide two or more knife edge prongs or teeth 9 which will bite into the side walls of the plank 1 and prevent the upper ends of the legs 2 from slipping, when said legs are in use. The upper ends of the gripping members 8 correspond in width to the inner walls of the legs and said gripping members will coöperate with the straps 4 in binding the upper end of each leg to prevent splitting and other injury thereto.

The lower ends of the gripping members 8 are connected to the legs 2 by bolts 10 and nuts 11 or other fastening means, and each gripping member has its lower end provided with an apertured side lug 12$^a$ so that a toggle or "break-up" brace may connect the legs 2. The toggle brace comprises arms 12 and 13, pivotally connected together, as at 14, with the outer ends thereof pivotally connected, as at 15, to the apertured lugs 12$^a$ of the gripping members 8. The opposite ends of the arms 12 and 13 are provided with studs or pins 16 adapted to engage in notches 17 provided therefor in the upper edges of the arms 12 and 13, so that the toggle arms cannot break down when placed in a horizontal position to connect the legs 2. The toggle arms afford a substantial brace between the legs 2 when in a diverging relation, and with said arms breaking upwardly between the spaced upper ends of the legs 2, the lower ends of said legs may be placed in close proximity to each other so that the collapsed legs may be easily carried or placed in a carpenter's kit.

I attach considerable importance to the gripping members 8 and the hardware at the upper ends of the legs 2, as the inner walls of the legs are firmly reinforced and a metallic connection established between the teeth 9 at one side of the plank 1 and the teeth 9 at the opposite side thereof. Such a connection avoids excessive strains and stresses on the wooden legs 2 during a clamping action to place the legs in use.

One embodiment of my invention has been illustrated, but it is to be understood that the structural elements are susceptible to such changes in size, shape and manner of assemblage, as fall within the scope of the appended claims.

What I claim is:—

1. Supporting means adapted to be clamped in engagement with a plank or the like, comprising wooden legs, metallic straps embracing said wooden legs adjacent the upper ends thereof, metallic connecting members having the ends thereof pivotally connected to said straps at the sides of said legs, combined reinforcing and gripping members on the inner walls of said legs of less length than said legs and having plank engaging teeth above the upper ends of said legs, apertured lugs at the lower ends of said combined reinforcing and gripping members, means extending through the upper ends of said legs connecting said straps and combined reinforcing and gripping members to said legs, and toggle arms connecting the lugs of said gripping members.

2. Plank supporting means as in claim 1, said toggle arms being of the break up type and provided with studs adapted to engage in notches of said arms to prevent breaking down of said toggle arms.

JOS. S. SMART.